United States Patent Office 3,657,393
Patented Apr. 18, 1972

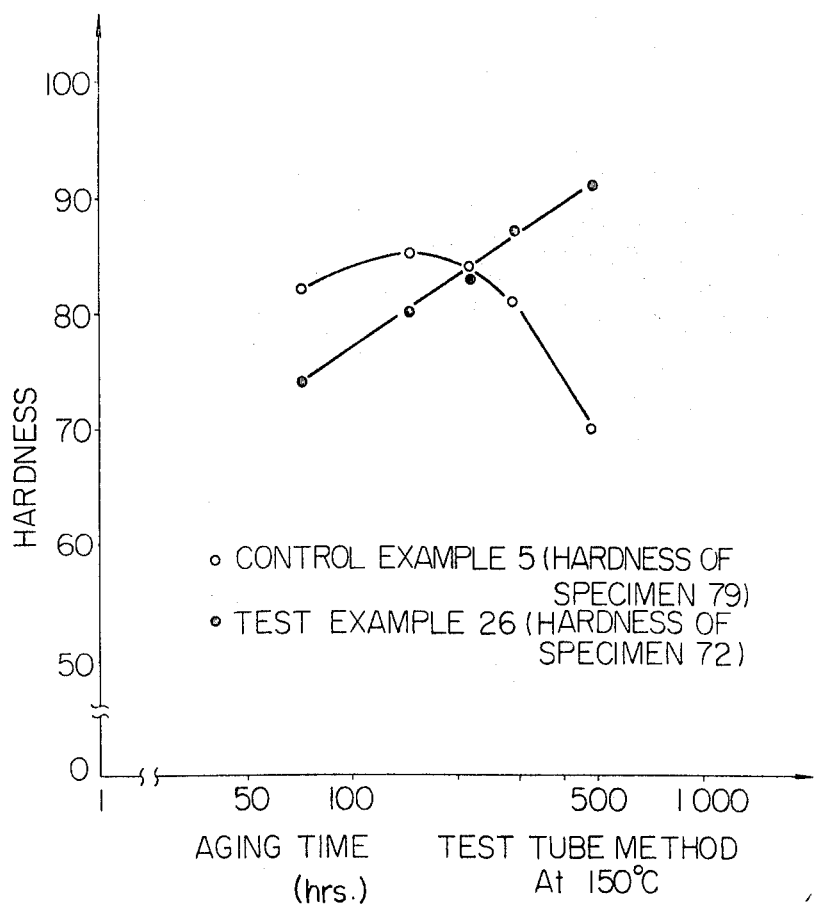

3,657,393
PROCESS FOR PREPARATION OF CROSS-LINKED EPICHLOROHYDRIN POLYMER
Keiji Komuro, Yokohama-shi, Masaaki Inagami, Toyonaka-shi, and Hideo Fukuda, Chigasaki-shi, Japan, assignors to The Japanese Geon Company, Ltd., Tokyo, Japan
Filed Jan. 21, 1970, Ser. No. 4,597
Claims priority, application Japan, Jan. 25, 1969, 44/5,031
Int. Cl. C08f 29/12
U.S. Cl. 260—887
3 Claims

ABSTRACT OF THE DISCLOSURE

A process for the preparation of an epichlorohydrin polymer having improved properties, which comprises treating a blend consisting of 100 parts of an epichlorohydrin polymer having a Mooney viscosity $ML_{1+4}$ (100° C.) of 30 to 140 and 1–30 parts by weight of a diene/acrylonitrile copolymer selected from a butadiene/acrylonitrile copolymer and an isoprene/acrylonitrile copolymer which has a bonded nitrile content of 10 to 60% by weight and a Mooney viscosity $ML_{1+4}$ (100° C.) of 30 to 130, with a cross-linking agent which crosslinks the epichlorohydrin polymer but not the diene-acrylonitrile copolymer.

---

Figure 1:
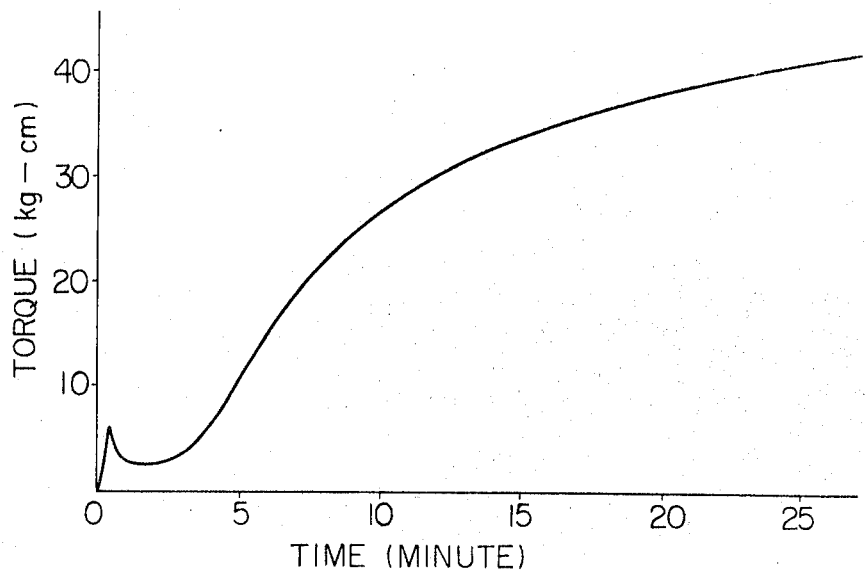

This invention relates to a process for the preparation of a cross-linked epichlorohydrin polymer having improved properties which is selected from the group consisting of an epichlorohydrin homopolymer and copolymers of epichlorohydrin with alkylene oxides.

More particularly, the invention relates to a method of producing an epichlorohydrin polymer having improved properties which comprises treating a blend of an epichlorohydrin homopolymer and/or a copolymer of epichlorohydrin and an alkylene oxide (hereinafter generically called an epichlorohydrin polymer) and a butadiene/acrylonitrile copolymer or an isoprene/acrylonitrile copolymer (hereinafter generically called a diene-acrylonitrile copolymer) with a cross-linking agent which crosslinks the epichlorohydrin polymer but not the diene-acrylonitrile polymer.

The epichlorohydrin polymer is an elastomer having an ether bond in its main chain which is obtained by the ring-opening polymerization of an epoxy group, and has excellent characteristics in resistance to oil, heat, cold, weather, chemicals and gas-impermeability. At present, in automobiles, airplanes, refrigerators and in the fields of machine parts, nitrile rubber and chloroprene rubber are used as oil-resistant hoses, gaskets, O-rings and oil seals, but are found not entirely satisfactory. Since the epichlorohydrin polymer has the above-mentioned excellent characteristics, they are expected to be fully utilizable in these applications. However, the epichlorohydrin polymer has some defects, for instance, in processability, a sagging phenomenon during vulcanization, strength characteristics, deterioration with softening, and wear resistance. Owing to an inherent stickiness, the epichlorohydrin polymer has poor processability in ordinary roll kneading, and exhibits a sagging phenomenon (hot flow) in the cross-linking of such a product as hose, resulting in the non-uniformity of cross-linked products. The cross-linked epichlorohydrin polymer is inferior in break strength and wear resistance, too. Furthermore, since the epichlorohydrin polymer has no unsaturated bond in its main chain, it is essentially excellent in resistance to oxidation and heat but owing to deterioration with softening, the product is deformed when it is used as an oil seal and O-ring, resulting in a decrease of commercial value. This leads to a demand for improvement towards deterioration with hardening.

Heretofore, the characteristics of rubber have been improved by blending compounding agents or mixing with other rubber having excellent properties and covulcanizing the mixture. Blending a compounding agent such as carbon is not particularly effective in removing the defects of an epichlorohydrin polymer. Mixing and covulcanization with other rubbers are technically difficult, and many problems have been left unsolved because different cross-linking agents and cross-linking promotors are necessary. It is well known that the epichlorohydrin polymer differs from the diene-acrylonitrile polymer in cross-linking system and speed; the former exhibits a slow speed of cross-linking while the latter, a rapid speed of cross-linking. No cross-linking system for the epichlorohydrin polymer has been found which shows a rapid cross-linking speed. When these two polymers are covulcanized, vulcanization becomes excessive since the phase of the diene/acrylonitrile polymer is vulcanized at a speed faster than a phase of the epichlorohydrin polymer, resulting in an abnormal rise in modulus and lowering in elongation. This not only impairs the initial vulcanization properties, but also changes the physical properties drastically after heat aging.

An object of the invention is to provide a rubber vulcanizate in which the defects of the epichlorohydrin polymer have been eliminated, namely, a rubber vulcanizate having improved sagging phenomenon, strength characteristics, aging properties and wear resistance.

It has now been found that this object of the invention can be achieved simply by blending a diene-nitrile polymer with an epichlorohydrin polymer as an organic filler unlike the conventional covulcanization. An improved cross-linked epichlorohylrin polymer can be obtained by blending an epichlorohydrin polymer (an epichlorohydrin homopolymer and/or copolymers of epichlorohydrin with alkylene oxides) with 1–30 parts by weight, preferably 5–10 parts by weight of a diene/acrylonitrile copolymer (a butadiene/acrylonitrile copolymer and/or isoprene/acrylonitrile copolymer) per 100 parts by weight of the epichlorohydrin polymer, and cross-linking the blend with a known cross-linking agent usually used in the cross-linking of an epichlorohydrin polymer. It has been said that suitable properties cannot be attained unless a suitable vulcanization is effected. The same can be said with respect to covulcanization. If two rubbers which can be vulcanized by the same vulcanizing system are compounded and vulcanized, a suitable degree of vulcanization can be obtained by adjusting the vulcanization temperature and time. But if each of the two rubbers is vulcanized by a different vulcanizing system, the use of a vulcanizing system for only one of the two rubbers leaves the other rubber completely unvulcanized, and it has been thought that this does not raise the vulcanization degree of the mixed vulcanizate and impairs the initial properties. The present invention has a great feature in that in cross-linking a blend of the epichlorohydrin polymer and the diene-acrylonitrile polymer, the defects of the epichlorohydrin polymer can be eliminated by using a cross-linking agent which does not cross-link the diene/acrylonitrile polymer.

Figure 2:
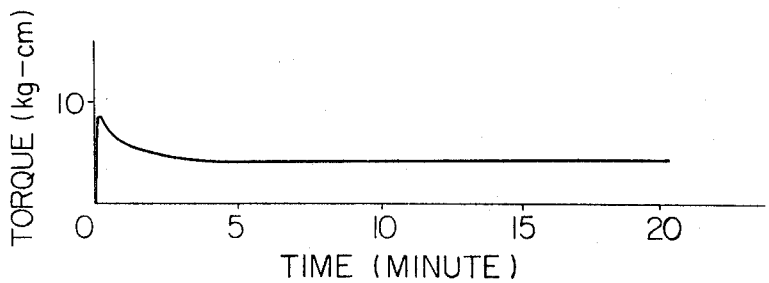

In the accompanying drawings, FIG. 1 is a graphic representation showing the cross-linking state of the epichlorohydrin polymer in Example 2; FIG. 2 is a graphic representation showing the cross-linking state of the butadiene/acrylonitrile polymer in Example 2; FIG. 3 is a graphic representation showing the effect of improvement of softening deterioration in Test Example 26 in Example 6.

The blend of the epichlorohydrin polymer and the diene-acrylonitrile copolymer in the present invention has a very excellent roll kneadability, and a rubber vulcanizate obtained by cross-linking the blend with a cross-linking agent usually used in the cross-linking of the epichlorohydrin polymer exhibits a very improved sagging phenomenon. Small amounts of a butadiene/acrylonitrile copolymer modified with divinyl benzene or divinyl pyridine or a diene/acrylonitrile copolymer obtained by polymerization at high temperatures and having a very high Mooney viscosity $ML_{1+4}$ (100° C.) effectively bring about the improvement of a sagging phenomenon. Furthermore, the rubber vulcanizates otained in accordance with the present invention have improved strength characteristics, showing low hardness, high elongation and high break strength at room temperature, and also have improved wear resistance. Furthermore, as shown in FIG. 3, a softening deterioration phenomenon is prevented. It is surprising that in a long period heat aging test, the vulcanizate of the present invention remains hard and is not softened. If, however, the amount of the diene/acrylontrile copolymer rubber exceeds 30% by weight, the strength characteristics and oil resistance of the blend are inferior.

The epichlorohydrin polymer used in the blend includes an epichlorohydrin homopolymer, copolymers of epichlorohydrin with alkylene oxides, e.g., an epichlorohydrin/ethylene oxide copolymer, an eichlorohydrin/propylene oxide copolymer, an epichlorohydrin/ethylene oxide/propylene oxide copolymer, and an epichlorohydrin/allyl glycidyl ether copolymer, and mixtures of these, and should have a Mooney viscosity $ML_{1+4}$ (100° C.) of 30 to 40. The diene/acrylonitrile copolymer is obtained by customary emulsion-polymerization or solution-polymerization, and has a bonded nitrile content of 10-60% by weight and a Money viscosity $ML_{1+4}$ (100° C.) of 30 to 130. When it is a butadiene/acrylonitrile copolymer rubber, it may be modified with divinyl benzene or divinyl pyridine.

As the cross-linking agents suitale for the cross-linking of the epichlorohydrin polymer, aliphatic polyamines such as ethylene diamine, hexamethylene diamine and triethylene tetramine, aromatic polyamines such as paraphenylene diamine, metaphenylene diamine and cumenediamine, polyamine carbamates such as ethylene diamine carbamate and hexamethylene carbamate, ketopolyamines such as urea, biuret, thiourea and dibutyl thiourea, and combinations of such compounds, 2-mercapto imidazolines or 2-mercapto pyrimidines with a compound of a metal of Group II–A, II–B, IIIA, IVA or VA of the periodic table are known. The most preferable combination to be used in the present invention is a combination of 2-mercaptoimidazoline and lead tetratrioxide.

The rubber cross-linked product according to the present invention is obtained by mixing the epichlorohydrin polymer and the diene-acrylonitrile copolymer with a mixer such as a roll mill and Banbury mixer, or mixing them in a solution and thereafter drying the mixture followed by cross-inking. The effects of the present invention are not impaired even if such usually used compounding agents as reinforcing agents, fillers, softening plasticizers and antioxidants are compounded with the mixture.

The invention will be described specifically by the following examples in which all parts are by weight.

EXAMPLE 1

Blends were prepared in accordance with the compounding recipe given in Table 1, and the roll kneadability of each blend was examined using an 8-inch roll at a temperature of 50 to 60° C. rolling at 20–24 r.p.m. The epichlorohydrin homopolymer had Mooney viscosity $ML_{1+4}$ (100° C.) of 55. The butadiene/acrylonitrile copolymer and isopreneacrylonitrile copolymer had Mooney viscosities $ML_{1+4}$ (100° C.) of 100 and 70, respectively. The results are shown in Table 1. For the sake of comparison, the results obtained with the epichlorohydrin homopolymer alone are also shown in Table 1.

It is seen from this example that by blending 10 parts by weight of the butadiene/acrylonitrile copolymer or isoprene/acrylonitrile copolymer with the epichlorohydrin homopolymer, the processability of the obtained blend is remarkably enhanced.

TABLE 1

|  | Control. Ex. 1 | Test Ex. (parts) 1 | 2 |
|---|---|---|---|
| Epichlorohydrin homopolymer [1] | 100 | 100 | 100 |
| Butadiene/acrylonitrile copolymer [2] |  | 10 |  |
| Isoprene/acrylonitrile copolymer [3] |  |  | 10 |
| Zinc stearate | 1 | 1 | 1 |
| FEF grade carbon | 50 | 50 | 50 |
| Roll kneadability | Bad | [4] | [4] |

[1] Hydrin 100 (tradename of the product of Goodrich Chemical, U.S.A.).
[2] Hycar 1411 (tradename of the product of Goodrich Chemical, U.S.A.).
[3] Krynac 833 (tradename of the product of Polymer Corporation, Canada).
[4] Excellent.

EXAMPLE 2

Blends were prepared in accordance with the compounding recipe shown in Table 2. Each blend was cross-linked with an oscillating disk rheometer at 155° C. and its torque was measured. As is seen from FIG. 1 (the torque of the epichlorohydrin homopolymer) and FIG. 2 (the torque of the butadiene/acrylonitrile polymer), the cross-linking of the butadiene/acrylonitrile copolymer does not take place in a crosslinking system used in the cross-linking of the epichlorohydrin homopolymer. In Test Example 5, the isoprene-acrylonitrile copolymer produced the same results as with the butadiene/acrylonitrile copolymer.

TABLE 2

|  | Test Ex. (parts) | | |
|---|---|---|---|
|  | 3 | 4 | 5 |
| Epichlorohydrin homopolymer, [1] | 100 |  |  |
| Hycar 1041 [2] |  | 100 |  |
| Krynac 833 [3] |  |  | 100 |
| Tin stearate | 1 | 1 | 1 |
| Trilead tetroxide | 5 | 5 | 5 |
| FEF grade carbon | 50 | 50 | 50 |
| 2-mercaptoimidazoline | 1.5 | 1.5 | 1.5 |
| Nickel dibutyldithiocarbamate | 2.0 | 2.0 | 2.0 |

[1] See footnote [1] bottom of Table 1.
[2] Tradename of a butadiene/acrylonitrile copolymer (product of Goodrich Chemical, U.S.A.; having a Mooney viscosity $ML_{1+4}$ (100° C.) of 85).
[3] See footnote [3] bottom of Table 1.

EXAMPLE 3

Rod-like blends were prepared in accordance with the compounding recipe shown in Table 3. Each blend having a length of 15 cm. was fixed horizontally at both ends at 150° C. in a gear-type air heating ageing tester, and cross-linked for 18 hours. The results obtained are shown in Table 3. The extent of sagging given in the table shows the maximum distance over which the horizontally fixed specimen was sagged during crosslinking. It is seen from the results obtained that a sagging phenomenon (during vulcanization) can be remarkably improved by blending the butadiene/acrylonitrile copolymer or isoprene/acrylonitrile copolymer.

TABLE 3

|  | Control Ex. 2 (parts) | Test Ex. (parts) | | | | |
|---|---|---|---|---|---|---|
|  |  | 6 | 7 | 8 | 9 | 10 |
| Epichlorohydrin homopolymer [1] | 100 | 100 | 100 | 100 | 100 | 100 |
| Hycar 1411 [2] |  | 10 | 30 |  |  |  |
| Hycar 1042 x 82 [3] |  |  |  | 10 | 30 |  |
| Krynac 833 [4] |  |  |  |  |  | 10 |
| Tin stearate | 1 | 1 | 1 | 1 | 1 | 1 |
| Trilead tetroxide | 5 | 5 | 5 | 5 | 5 | 5 |
| FEF grade carbon | 50 | 50 | 50 | 50 | 50 | 50 |
| 2-mercaptoimidazoline | 1.5 | 1.5 | 1.5 | 1.5 | .15 | 1.5 |
| Nickel-dibutyldithio-carbamate | 2.0 | 2.0 | 2.0 | 2.0 | .2.0 | 2.0 |
| Extent of sagging, cm | 4.5 | 3.0 | 2.0 | 3.5 | 3.0 | 3.0 |

[1] See footnote [1] bottom of table 1.
[2] See footnote [2] bottom of Table 1.
[3] Butadiene-acrylonitrile copolymer (a product of Goodrich Chemical, U.S.A., having a Mooney viscosity of $ML_{1+4}$ (100° C.)=83 and containing cross-linked gel).
[4] See footnote [3] bottom of Table 1.

EXAMPLE 4

Blends were prepared in accordance with the compounding recipe shown in Table 4. Each blend was kneaded with two roll mills at 50 to 80° C., and cross-linked in a steel mold for 30 minutes at 155° C. The strength characteristics and wear resistance of the blend were examined. The results are shown in Table 5. It is seen from the results obtained that the tensile strength, elongation and wear resistance of the blend are improved by compounding 10 parts of the butadiene/acrylonitrile copolymer.

TABLE 4

|  | Control Ex. 3 (parts) | Test Exs. 11-17 (parts) |
|---|---|---|
| Epichlorohydrin homopolymer [1] | 100 | 100 |
| Butadiene/acrylonitrile copolymer |  | 10 |
| Tin stearate | 1 | 1 |
| Trilead tetroxide | 5 | 5 |
| 2-mercapto imidazoline | 1.5 | 1.5 |
| Nickel dibutyl dithiocarbamate | 2.0 | 2.0 |
| FEF grade carbon | 50 | 50 |

[1] See footnote (1) bottom of Table 1.

TABLE 5

|  | Control Ex. 3 | Test Ex.— | | | | | | |
|---|---|---|---|---|---|---|---|---|
|  |  | 11 | 12 | 13 | 14 | 15 | 16 | 17 |
| Blended butadiene-acrylonitrile copolymer, Hycar |  | [1] 1000 x 132 | [2] 1041 | [3] 1411 | [4] 1042 | [5] 1042 x 82 | [6] 1043 | [7] 1014 |
| Tensile strength (kg./cm.$^2$) | 158 | 161 | 183 | 169 | 173 | 177 | 185 | 179 |
| Elongation (percent) | 280 | 350 | 380 | 300 | 340 | 330 | 350 | 320 |
| 200% modulus (kg./cm.$^2$) | 147 | 124 | 124 | 134 | 115 | 135 | 129 | 131 |
| Hardness (JIS) | 82-80 | 76-71 | 72-68 | 78-74 | 70-66 | 74-70 | 72-68 | 74-71 |
| Williams wear (cc./fP hr.) | 900 | 650 | 770 | 800 | 730 | 690 | 720 | 660 |

[1] Butadiene-acrylonitrile copolymer (amount of nitrile: 50%, Mooney viscosity; ML$_{1+4}$ (100° C.)=48, a product of Goodrich Chemical, U.S.A.).
[2] Butadiene-acrylonitrile copolymer (amount of nitrile: 40%, Mooney viscosity; ML$_{1+4}$ (100° C.)=85, a product of Goodrich Chemical, U.S.A.).
[3] Butadiene-acrylonitrile copolymer (amount of nitrile: 40%, Mooney viscosity; ML$_{1+4}$ (100° C.)=100, a product of Goodrich Chemical, U.S.A.).
[4] Butadiene-acrylonitrile copolymer (amount of nitrile: 34%, Mooney viscosity; ML$_{1+4}$ (100° C.)=84, a product of Goodrich Chemical, U.S.A.).
[5] Butadiene-acrylonitrile copolymer (amount of nitrile: 34%, Mooney viscosity; ML$_{1+4}$ (100° C.)=83, a product of Goodrich Chemical, U.S.A.).
[6] Butadiene-acrylonitrile copolymer (amount of nitrile: 28%, Mooney viscosity; ML$_{1+4}$ (100° C.)=82, a product of Goodrich Chemical, U.S.A.).
[7] Butadiene-acrylonitrile copolymer (amount of nitrile: 18%, Mooney viscosity; ML$_{1+4}$ (100° C.)=73, a product of Goodrich Chemical, U.S.A.).

EXAMPLE 5

The strength characteristics and wear resistance were examined in the same manner as in Example 4 except using an epichlorohydrin/ethylene oxide copolymer (Hydrin 200, ML$_{1+4}$ (100° C.)=95, Goodrich Chemical, U.S.A.) instead of the epichlorohydrin homopolymer used in Example 4. The results are shown in Table 6. Improvements are seen in the tensile strength, elongation and wear resistance like Example 4.

TABLE 6

|  | Control Ex. 4 | Test Ex.— | | | | | | |
|---|---|---|---|---|---|---|---|---|
|  |  | 18 | 19 | 20 | 21 | 22 | 23 | 24 |
| Blended butadiene-acrylonitrile copolymer, Hycar |  | 1000 x 132 | 1041 | 1411 | 1042 | 1042 x 82 | 1043 | 1014 |
| Tensile strength (kg./cm.$^2$) | 145 | 158 | 177 | 173 | 169 | 161 | 159 | 164 |
| Elongation (percent) | 230 | 310 | 370 | 350 | 400 | 340 | 410 | 420 |
| 200% modulus (kg./cm.$^2$) | 109 | 113 | 129 | 131 | 108 | 113 | 107 | 105 |
| Hardness (JIS) | 81-79 | 79-76 | 79-76 | 78-75 | 78-76 | 78-75 | 77-75 | 76-74 |
| Williams wear (cc./fP hr.) | 1200 | 950 | 1000 | 650 | 800 | 900 | 850 | 800 |

EXAMPLE 6

An epichlorohydrin homopolymer having a Mooney viscosity ML$_{1+4}$ (100° C.) of 55 was compounded with a butadiene/acrylonitrile copolymer having an ML$_{1+4}$ (100° C.) of 85 or an isoprene/acrylonitrile copolymer having an ML$_{1+4}$ (100° C.) of 70 at 50-80° C. by means of two roll mills in accordance with the recipe shown in Table 7, and the blend was cross-linked for 30 minutes at 155° C. in a steel mold. The strength characteristics, wear resistance, resistance to aging and oil resistance were examined. The aging test was conducted in a test tube type air heating aging tester at 150° C. The results are shown in Table 8. Control Example 6 was practiced in accordance with the conventional covulcanization recipe.

TABLE 7

|  | Control Ex. 5 (parts) | Test Ex. parts | | | | Control Ex. 6 (parts) |
|---|---|---|---|---|---|---|
|  |  | 25 | 26 | 27 | 28 |  |
| Epichlorohydrin homopolymer [1] | 100 | 100 | 100 | 100 | 100 | 100 |
| Hycar 1041 [2] |  | 5 | 10 | 30 |  | 30 |
| Krynac 833 [3] |  |  |  |  | 10 |  |
| Tin stearate | 1 | 2 | 1 | 1 | 1 | 1 |
| Trilead tetroxide | 5 | 5 | 5 | 5 | 5 | 5 |
| Zinc flower |  |  |  |  |  | 1.5 |
| FEF grade carbon | 50 | 50 | 50 | 50 | 50 | 50 |
| 2-mercaptomidazoline | 1.5 | 1.5 | 1.5 | 1.5 | 1.5 | 1.5 |
| Dibenzothiazyl disulfide |  |  |  |  |  | 0.6 |
| Sulfur |  |  |  |  |  | 0.45 |
| Nickel-dibutyldithiocarbamate | 2.0 | 2.0 | 2.0 | 2.0 | 2.0 | 2.0 |

[1] See footnote (1) bottom of Table 1.
[2] See footnote (2) bottom of Table 5.
[3] See footnote (3) bottom of Table 1.

TABLE 8

|  | Control Ex. 5 | Test Ex. 25 | Test Ex. 26 | Test Ex. 27 | Test Ex. 28 | Control Ex. 6 |
|---|---|---|---|---|---|---|
| Tensile strength (kg./cm.$^2$) | 153 | 173 | 179 | 189 | 175 | 177 |
| Elongation (percent) | 290 | 330 | 370 | 510 | 350 | 240 |
| 100% modulus (kg./cm.$^2$) | 77 | 69 | 61 | 38 | 66 | 99 |
| 200% modulus (kg./cm.$^2$) | 143 | 136 | 130 | 90 | 132 | 152 |
| Hardness (JIS) | 79–75 | 75–73 | 72–69 | 66–61 | 77–74 | 71–69 |
| Block cross-linked for 45 minutes: | | | | | | |
| Repulsive elasticity (percent) | 18.0 | 19.5 | 20.5 | 25.0 | 18.5 | 26.5 |
| Permanent strain on compression (percent) 130° C. x 70 hours | 67.4 | 67.0 | 65.3 | 67.8 | 64.5 | 67.1 |
| Williams wear (cc./IP hr.) | 900 | 820 | 770 | 550 | 680 | 500 |
| Dipped of 100 C. for 70 hours in ASTM #3 oil: | | | | | | |
| Tensile strength (kg./cm.$^2$) | 160 | 165 | 168 | 173 | 167 | 168 |
| Elongation (percent) | 210 | 230 | 250 | 360 | 230 | 160 |
| 200% modulus (kg./cm.$^2$) | 159 | 153 | 149 | 108 | 150 | 171 |
| Hardness (JIS) | 75–73 | 72–69 | 70–68 | 61–57 | 70–66 | 74–71 |
| Change in volume (percent) | +7.1 | +7.4 | +7.7 | +8.3 | 7.8 | +6.8 |
| Immersed for 70 hours at room temperature in fuel B: | | | | | | |
| Tensile strength (kg./cm.$^2$) | 117 | 115 | 115 | 110 | | |
| Elongation (percent) | 180 | 210 | 230 | 320 | | |
| 200% modulus (kg./cm.$^2$) | | 111 | 108 | 77 | | |
| Hardness (JIS) | 69–68 | 65–63 | 63–61 | 52–50 | | |
| Change in volume (percent) | +17.3 | +18.6 | +20.0 | +22.1 | | |
| After aging for 3 days at 150° C.: | | | | | | |
| Tensile strength (kg./cm.$^2$) | 180 | 177 | 176 | 150 | 178 | |
| Elongation (percent) | 130 | 130 | 130 | 150 | 130 | |
| 100% modulus (kg./cm.$^2$) | 144 | 143 | 141 | 91 | 142 | |
| Hardness (JIS) | 82–80 | 77–75 | 74–72 | 70–66 | 76–73 | |
| After aging for 6 days at 150° C.: | | | | | | |
| Tensile strength (kg./cm.$^2$) | 133 | 125 | 120 | 78 | | 19 |
| Elongation (percent) | 160 | 120 | 100 | 60 | | 10 |
| 100% modulus (kg./cm.$^2$) | 91 | 90 | | | | |
| Hardness (JIS) | 85–83 | 83–81 | 80–78 | 78–75 | | 96–92 |
| After aging for 9 days at 150° C.: | | | | | | |
| Tensile strength (kg./cm.$^2$) | 101 | 81 | 63 | 36 | 65 | |
| Elongation | 150 | 80 | 60 | 20 | 60 | |
| 100% modulus (kg./cm.$^2$) | 71 | | | | | |
| Hardness (JIS) | 84–80 | 84–81 | 83–80 | 80–78 | 84–80 | |
| After aging for 12 days at 150° C.: | | | | | | |
| Tensile strength (kg./cm.$^2$) | 67 | 57 | 40 | (¹) | 43 | |
| Elongation (percent) | 170 | 70 | 60 | (¹) | 50 | |
| 100% modulus (kg./cm.$^2$) | 46 | | | | | |
| Hardness (JIS) | 81–74 | 85–82 | 87–82 | 89–87 | 89–84 | |
| After aging for 20 days at 150° C.: | | | | | | |
| Tensile strength (kg./cm.$^2$) | 22 | (¹) | (¹) | (¹) | | |
| Elongation (percent) | 220 | (¹) | (¹) | (¹) | | |
| 100% modulus (kg./cm.$^2$) | 17 | | | | | |
| Hardness (JIS) | 70–60 | 88–85 | 91–90 | 90–88 | | |

¹ Not measurable owing to hardening.

The oil resistance was not deteriorated even when the butadiene/acrylonitrile copolymer was compounded. After aging for 20 days, the crosslinked epichlorohydrin homopolymer was softened, but the blend remained hard (FIG. 3). Furthermore, as shown in Control Example 6, according to the conventional covulcaniztion method, the modulus of the resulting blend was very high, showing 99 for 100% modulus and 152 for 200% modulus. It is seen from the data obtained after a six-day ageing that a hardening deterioration occurs too abruptly.

EXAMPLE 7

An epichlorohydrin/ethylene oxide copolymer rubber having an $ML_{1+4}$ (100° C.) of 95 was compounded with a butadiene/acrylonitrile copolymer rubber having an $ML_{1+4}$ (100° C.) of 85 in accordance with the recipe shown in Table 9, and the resulting blend was subjected to an aging test under the same conditions as in Example 6. The results obtained are shown in Table 10.

TABLE 9

|  | Control Ex. 7, parts | Test Ex. parts 28 | Test Ex. parts 29 |
|---|---|---|---|
| Epichlorohydrin/ethylene oxide copolymer ¹ | 100 | 100 | 100 |
| Hycar 1041 ² | | 10 | 20 |
| Tin stearate | 1 | 1 | 1 |
| Trilead tetroxide | 5 | 5 | 5 |
| FEF grade carbon | 50 | 50 | 50 |
| 2-mercaptoimidazoline | 1.5 | 1.5 | 1.5 |
| Nickel dibutyl dithiocarbamate | 2.0 | 2.0 | 2.0 |

¹ See footnotes (¹,³) bottom of Table 1.
² See footnote (⁷) bottom of Table 5.

TABLE 10

|  | Control Ex. 7 | Test Ex. 28 | Test Ex. 29 |
|---|---|---|---|
| Tensile strength (kg./cm.$^2$) | 145 | 177 | 174 |
| Elongation (percent) | 230 | 370 | 540 |
| 100% modulus (kg./cm.$^2$) | 76 | 67 | 45 |
| 200% modulus (kg./cm$^2$.) | 109 | 129 | 930 |
| Hardness (JIS) | 81–79 | 79–76 | 74–69 |
| Williams wear (cc./IP hr.) | 1,200 | 1,000 | 800 |
| After aging for 3 days at 150° C.: | | | |
| Tensile strength (kg./cm.$^2$) | 159 | 155 | 122 |
| Elongation (percent) | 130 | 120 | 120 |
| 100% modulus (kg./cm.$^2$( | 129 | 134 | 158 |
| Hardness (JIS) | 84–82 | 84–81 | 81–78 |
| After aging for 9 days at 150° C.: | | | |
| Tensile strength (kg./cm.$^2$) | 63 | (¹) | (¹) |
| Elongation (percent) | 180 | (¹) | (¹) |
| 100% modulus (kg./cm.$^2$) | 43 | | |
| Hardness (JIS) | 74–70 | 88–86 | 90–88 |

¹ Not measurable owing to hardening.

EXAMPLE 8

An epichlorohydrin homopolymer having an $ML_{1+4}$ (100° C.) of 55 was compounded with a butadiene/acrylonitrile copolymer having an $ML_{1+4}$ (100° C.) of 85 in accordance with the recipes shown in Tables 11, 13 and 15, and the aging test was conducted under the same conditions as Example 6. The test results are shown in Tables 12, 14 and 16. A series of these experiments was conducted with the use of various cross-linking agents.

TABLE 11

| | Control Ex. 8 | Text Ex. 30 | Text Ex. 31 |
|---|---|---|---|
| Hydrin 100 [1] | 100 | 100 | 100 |
| Hycar 1041 [2] | | 10 | 20 |
| Zinc stearate | 1 | 1 | 1 |
| Trilead tetroxide | 5 | 5 | 5 |
| FEF grade carbon | 30 | 30 | 30 |
| Nickel-dibutyldithiocarbamate | 1 | 1 | 1 |
| Hexamethylene diamine | 0.75 | 0.75 | 0.75 |

[1] See footnote (1) bottom of Table 1.
[2] See footnote (2) bottom of Table 2.

TABLE 12

| | Control Ex. 8 | Text Ex. 30 | Text Ex. 31 |
|---|---|---|---|
| Cross-linked for 30 minutes at 155° C.: | | | |
| Tensile strength (kg./cm.²) | 152 | 167 | 180 |
| Elongation (percent) | 480 | 580 | 650 |
| 100% modulus (kg./cm.²) | 51 | 41 | 35 |
| 200% modulus (kg./cm.²) | 89 | 85 | 54 |
| Hardness (JIS) | 76–74 | 70–68 | 63–60 |
| Williams wear (cc./Phr.) | 500 | 450 | 350 |
| After aging for 6 days at 150° C.: | | | |
| Tensile strength (kg./cm.²) | 41 | 53 | 49 |
| Elongation (percent) | 290 | 200 | 150 |
| 100% modulus (kg./cm.²) | 35 | 28 | 27 |
| Hardness (JIS) | 85–77 | 81–79 | 74–71 |
| After aging for 20 days at 150° C.: | | | |
| Tensile strength (kg./cm.²) | 15 | (1) | (1) |
| Elongation (percent) | 280 | (1) | (1) |
| 100% modulus (kg./cm.²) | 5 | | |
| Hardness (JIS) | 53–50 | 91–90 | 94–92 |

[1] Not measurable.

TABLE 13

| | Control Ex. 9 | Test Ex. 32 | Test Ex. 33 |
|---|---|---|---|
| Hydrin 100 [1] | 100 | 100 | 100 |
| Hycar 1041 [2] | | 10 | 30 |
| Zinc stearate | 1 | 1 | 1 |
| Trilead tetroxide | 5 | 5 | 5 |
| FEF grade carbon | 30 | 30 | 30 |
| Nickel dibutyl dithiocarbamate | 1 | 1 | 1 |
| Trimethyl thiourea | 2.5 | 2.5 | 2.5 |

[1] See footnote (1) bottom Table 1.
[2] See footnote (2) bottom Table 2.

TABLE 14

| | Control Ex. 9 | Test Ex. 32 | Test Ex. 33 |
|---|---|---|---|
| Cross-linked for 30 minutes at 155° C.: | | | |
| Tensile strength (kg./cm.²) | 162 | 171 | 198 |
| Elongation (percent) | 640 | 680 | 790 |
| 100% modulus (kg./cm.²) | 41 | 31 | 25 |
| 200% modulus (kg./cm.²) | 69 | 62 | 53 |
| Hardness (JIS) | 61–58 | 51–49 | 47–45 |
| Williams wear (cc./P hr.) | 940 | 800 | 650 |
| After aging for 6 days at 150° C.: | | | |
| Tensile strength (kg./cm.²) | 19 | 25 | 32 |
| Elongation (percent) | 320 | 180 | 150 |
| 100% modulus (kg./cm.²) | 10 | 21 | 28 |
| Hardness (JIS) | 52–34 | 82–80 | 89–87 |
| After aging for 20 days at 150° C.: | | | |
| Tensile strength (kg./cm.²) | | (1) | (1) |
| Elongation (percent) | (2) | (1) | (1) |
| 100% modulus (kg./cm.²) | (2) | | |
| Hardness (JIS) | | 94–92 | 96–94 |

[1] Not measurable owing to hardening.
[2] The specimens were broken owing to softening.

TABLE 15

| | Control Ex. 10 | Test Ex. 34 | Control Ex. 11 | Test Ex. 35 | Control Ex. 12 | Test Ex. 36 |
|---|---|---|---|---|---|---|
| Hydrin 100 [1] | 100 | 100 | 100 | 100 | 100 | 100 |
| Hycar 1041 [2] | | 10 | | 10 | | 10 |
| Zinc stearate | 1 | 1 | 1 | 1 | 1 | 1 |
| Dibasic lead phthalate | 5 | 5 | | | | |
| Dibasic lead phosphite | | | 5 | 5 | | |
| Magnesium oxide | | | | | 5 | 5 |
| FEF carbon | 50 | 50 | 50 | 50 | 50 | 50 |
| Nickel-dubutyl-dithiocarbamate | 2 | 2 | 2 | 2 | 2 | 2 |
| 2-mercapto-imidazoline | 1.5 | 1.5 | 1.5 | 1.5 | 1.5 | 1.5 |

[1] See footnote (1) bottom Table 1.
[2] See footnote (2) bottom Table 2.

TABLE 16

| | Control Ex. 10 | Test Ex. 34 | Control Ex. 11 | Test Ex. 35 | Control Ex. 12 | Test Ex. 36 |
|---|---|---|---|---|---|---|
| Cross-linked for 30 minutes at 155° C.: | | | | | | |
| Tensile strength (kg./cm.²) | 125 | 142 | 138 | 153 | 135 | 155 |
| Elongation (percent) | 360 | 430 | 360 | 480 | 350 | 510 |
| 100% modulus (kg./cm.²) | 65 | 54 | 61 | 49 | 53 | 41 |
| Hardness (JIS) | 80–72 | 70–65 | 80–74 | 69–64 | 74–70 | 61–57 |
| After aging for 6 days at 150° C.: | | | | | | |
| Tensile strength (kg./cm.²) | 113 | 105 | 107 | 98 | 138 | 118 |
| Elongation (percent) | 210 | 150 | 220 | 90 | 200 | 80 |
| 100% modulus (kg./cm.²) | 64 | 83 | 60 | | 80 | |
| Hardness (JIS) | 80–72 | 81–76 | 80–71 | 82–80 | 77–74 | 79–78 |
| After aging for 20 days at 150° C.: | | | | | | |
| Tensile strength (kg./cm.²) | 38 | (1) | 12 | (1) | 54 | (1) |
| Elongation (percent) | 280 | (1) | 380 | (1) | 280 | (1) |
| 100% modulus (kg./cm.²) | 15 | | | | 21 | |
| Hardness (JIS) | 52–50 | 92–90 | 50–48 | 93–92 | 58–56 | 93–91 |

[1] Not measurable owing to hardening.

What is claimed is:

1. A process for the preparation of an epichlorohydrin polymer having improved properties, which comprises treating a blend consisting of an epichlorohydrin polymer having a Mooney viscosity $ML_{1+4}$ (100° C.) of 30 to 140 and 1–30 parts by weight per 100 parts by weight of said epichlorohydrin polymer of a diene/acrylonitrile copolymer selected from a butadiene/acrylonitrile copolymer and an isoprene/acrylonitrile copolymer having a bonded nitrile content of 10 to 60% by weight and a Mooney viscosity $ML_{1+4}$ (100° C.) of 30 to 130, with a cross-linking agent selected from the group consisting of aliphatic polyamines, aromatic polyamines, polyamine carbamates, ketopolyamines, 2-mercapto imidazolines with a compound of a metal, and 2-mercapto pyrimidines with a compound of a metal which cross-links said epichlorohydrin polymer in the absence of a cross-linking agent which cross-links said diene/acrylonitrile copolymer.

2. A process of claim 1 wherein said epichlorohydrin polymer is an epichlorohydrin homopolymer.

3. A process of claim 1 wherein said epichlorohydrin polymer is a copolymer of epichlorohydrin with an alkylene oxide.

References Cited

UNITED STATES PATENTS

| 3,351,517 | 11/1967 | Willis | 161—184 |
| 3,445,544 | 5/1969 | Schmitt | 260—876 |

SAMUEL H. BLECH, Primary Examiner

C. J. SECCURO, Assistant Examiner

U.S. Cl. X.R.

260—23.7 N, 41.5 R